United States Patent
Nishioka

(10) Patent No.: US 7,835,045 B2
(45) Date of Patent: Nov. 16, 2010

(54) IMAGE PROCESSING DEVICE AND IMAGE PROCESSING METHOD

(75) Inventor: Naoki Nishioka, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 442 days.

(21) Appl. No.: 12/107,661

(22) Filed: Apr. 22, 2008

(65) Prior Publication Data

US 2008/0266612 A1    Oct. 30, 2008

(30) Foreign Application Priority Data

Apr. 24, 2007   (JP)   ............... 2007-113870

(51) Int. Cl.
*G03F 3/08*     (2006.01)
*H04N 1/46*    (2006.01)
*H04N 1/60*    (2006.01)
*G06K 9/00*    (2006.01)

(52) U.S. Cl. ............... 358/518; 358/505; 358/515; 358/1.9; 382/162; 382/163; 382/167; 382/283

(58) Field of Classification Search .......... 358/518, 358/505, 515, 1.9; 382/162, 163, 167, 283
See application file for complete search history.

(56) References Cited

U.S. PATENT DOCUMENTS 5,182,638 A * 1/1993 Tsuboi et al. ............... 358/518
6,157,426 A * 12/2000 Gu ............................. 349/111
7,075,681 B1 * 7/2006 Brothers .................. 358/426.01

FOREIGN PATENT DOCUMENTS

| JP | 08154181 A | 6/1996 |
|---|---|---|
| JP | 08289143 A | 11/1996 |
| JP | 2004-153586 | 5/2004 |
| JP | 2004-221915 | 8/2004 |
| JP | 2004-282489 | 10/2004 |

OTHER PUBLICATIONS

Japanese language office action and its English language translation for corresponding Japanese application 2007113870 lists the references above.

* cited by examiner

*Primary Examiner*—Charlotte M Baker
(74) *Attorney, Agent, or Firm*—DLA Piper LLP (US)

(57) ABSTRACT

An image processing device detects a candidate area of a background color in a chromaticity plane with respect to an original scanned document. A background color area is determined based on the candidate area of the detected background color. Boundary lines extending from the determined background color area to an achromatic-color area are generated. The background color area and an area surrounded by the background color area and the boundary lines are set as a mask, and the background color of the original document is deleted.

20 Claims, 6 Drawing Sheets

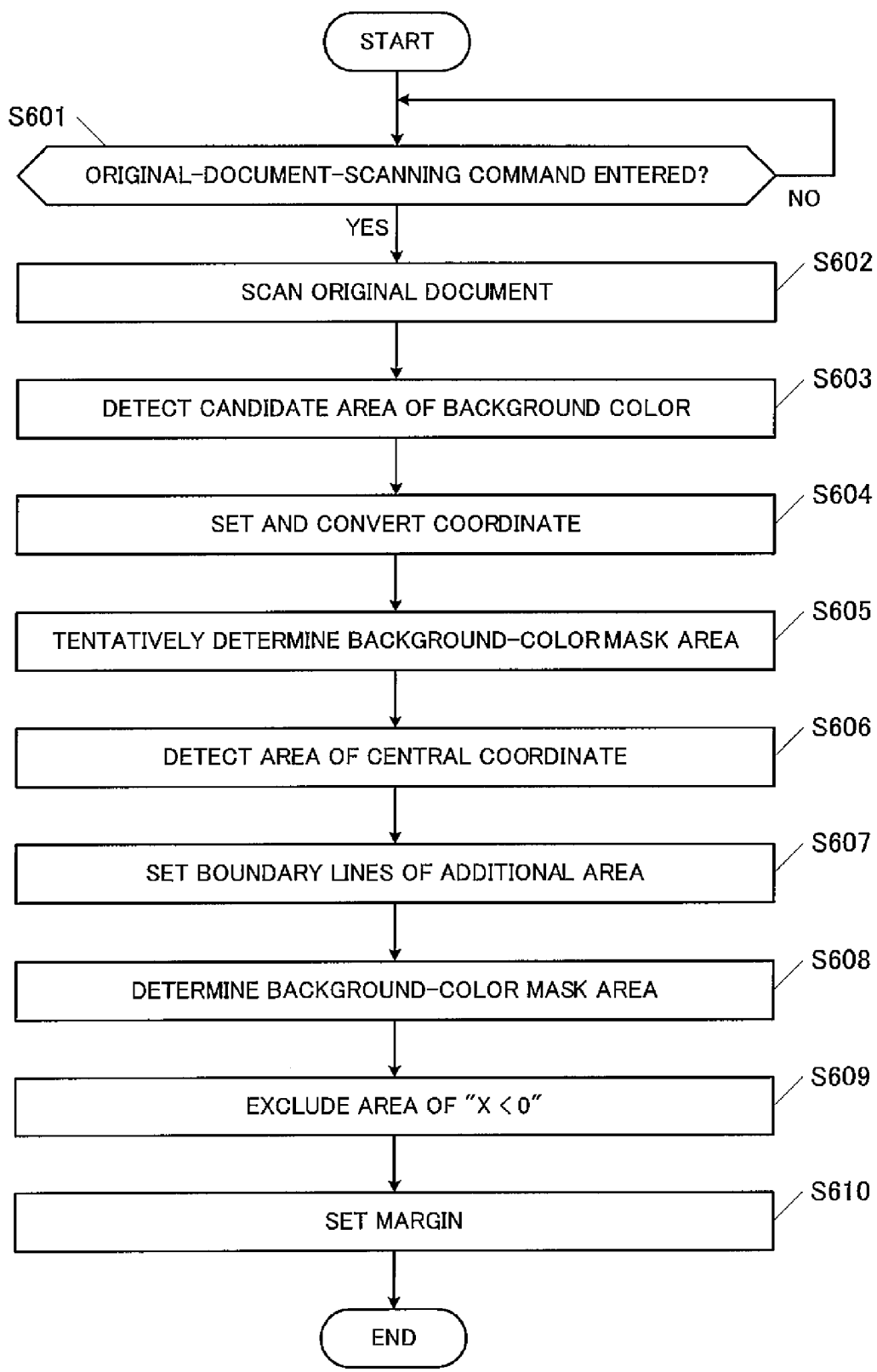

IMAGE PROCESSING DEVICE AND IMAGE PROCESSING METHOD

CROSS-REFERENCE TO RELATED APPLICATIONS

This application claims priority under 35 U.S.C. 119 to Japanese Patent Application No. 2007-113870, filed on Apr. 24, 2007, which application is hereby incorporated by reference in its entirety.

BACKGROUND OF THE INVENTION

1. Field of the Invention

The present invention relates to determining whether a scanned original document is in color or monochrome. More specifically, the present invention relates to an image processing device and method that remove a color from a background color and handle the background color as monochrome even when the background color is chromatic, by extracting the background color of the scanned original document and masking the background color.

2. Description of the Related Art

In order to determine whether a scanned original document is in color or monochrome, conventional art suggests dividing a chromaticity plane (an a*b* plane of the L*a*b* uniform color space) into 25 rectangular areas, and determining whether or not a pixel exists in each of the areas.

In the suggested conventional art, each of the 25 areas is disposed in the vicinity of the center of the chromaticity plane. Therefore, a background color area that is disposed outside the 25 areas cannot be detected. Thus, in the conventional art, it may be difficult to detect a chromatic background color (chromaticity and hue). In other words, in a color original document, it may be difficult to extract and remove a background color area that is disposed away from the center of the chromaticity plane.

SUMMARY OF THE INVENTION

In order to overcome the above-described problems, the present invention provides a technique for reliably extracting and masking a background color area.

A first aspect of the present invention provides a scanning unit that scans an original document; a background-color detecting unit that detects a candidate area of a background color in a chromaticity plane; a background-color-area determining unit that determines a background color area based on the candidate area of the background color detected by the background-color detecting unit; and a mask setting unit that generates a boundary line extending from the background color area determined by the background-color-area determining unit towards an achromatic-color area, and sets, as a mask, the background color area and an area surrounded by the background color area and the boundary line.

A second aspect of the present invention further provides a coordinate setting unit that sets an orthogonal-plane coordinate system based on the candidate area of the background color detected by the background-color detecting unit. The background-color-area determining unit determines the background color area in the orthogonal-plane coordinate system.

According to a third aspect of the present invention, the background-color-area determining unit adds an additional area based on a position of the candidate area in the orthogonal-plane coordinate system and determines the background color area.

According to a fourth aspect of the present invention, the mask setting unit excludes a predetermined area from the background color area determined by the background-color-area determining unit and sets the mask.

A fifth aspect of the present invention provides a margin setting unit that sets a margin around the background color area determined by the background-color-area determining unit, to expand a mask area.

According to a sixth aspect of the present invention, the coordinate setting unit performs coordinate setting such that the candidate area detected by the background-color detecting unit falls within a predetermined area in the orthogonal-plane coordinate system.

According to a seventh aspect of the present invention, the background color detected by the background-color detecting unit is color, gray or blank.

According to the first aspect of the present invention, since the candidate area of the detected background color is expanded to the achromatic-color area to mask the background color, the background color can be reliably masked. Hereinafter, a "chromaticity plane" indicates a plane that has an achromatic axis as the center and two parameters, which represent colors, as coordinate axes. For example, the plane may be a CbCr color-difference plane in a YCbCr calorimetric system and/or an a*b* chromaticity plane in an L*a*b* calorimetric system, but is not limited to the CbCr color-difference plane and the a*b* chromaticity plane. The "mask" indicates an area in color space that is determined as achromatic even when the color space is chromatic.

According to the second aspect of the present invention, since the background-color-area determining unit determines the background color area in the orthogonal-plane coordinate system based on the candidate area, the background color area can be reliably and accurately masked.

According to the third aspect of the present invention, since the background-color-area determining unit adds the additional area based on the position of the candidate area in the orthogonal-plane coordinate system, the background color can be reliably masked.

According to the fourth aspect of the present invention, since the mask setting unit excludes the predetermined area from the background color area determined by the background-color-area determining unit and sets the mask, a computation area for the background-color mask and a circuit size can be reduced.

According to the fifth aspect of the present invention, since the margin is set around the background color area determined by the background-color-area determining unit to expand the mask area, the background color area can be reliably masked.

According to the sixth aspect of the present invention, since the coordinate setting unit performs the coordinate setting such that the candidate area detected by the background-color detecting unit falls within the predetermined area in the orthogonal-plane coordinate system, the computation area for the background-color mask can be reduced, and also the circuit size can be reduced.

According to the seventh aspect of the present invention, since the background color detected by the background-color detecting unit is color, gray or blank, the mask can be performed in accordance with each of the background colors.

According to an eighth aspect of the present invention, since the candidate area of the detected background color is expanded to the achromatic-color area to mask the background color, the background color can be reliably masked.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 6 is a flow chart of execution procedures of the background-color masking process.

DETAILED DESCRIPTION OF EMBODIMENTS OF THE INVENTION

First Embodiment

With reference to the drawings, a copier is now described as an example of an image processing device according to a first embodiment of the present invention.

Configuration

Figure 1:
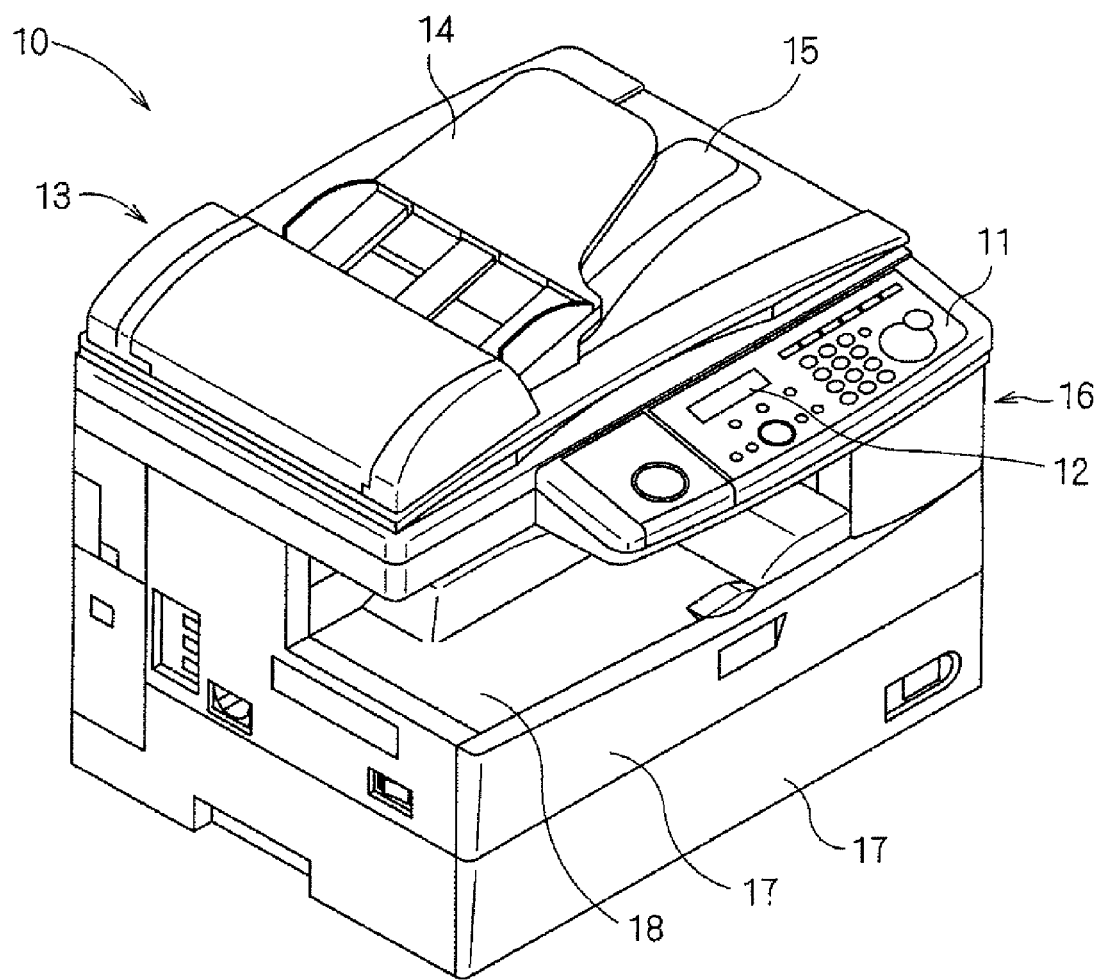
FIG. 1 is a perspective view of a copier according to a first embodiment of the present invention.

FIG. 1 is a perspective view of a copier 10 according to the first embodiment of the present invention. The copier 10 generates image data by scanning an original document, and prints on recording paper based on the image data. In the drawings, only elements and/or functions that relate to the present invention are illustrated. Moreover, a chromaticity plane on which coordinate conversion and a masking process are performed is a CbCr color-difference plane in a YCbCr calorimetric system.

An operation unit 11 includes a numeric keypad and mechanical switches such as various function keys for operating the copier 10. When the keys are operated by a user, the operation unit 11 accepts various commands such as scanning and copying or the like of the original document.

A display unit 12 is a general display including a displaying device such as a liquid crystal display (LCD) or the like, and displays various information as images on a screen. Display unit 12 may include a touch screen that performs a part or all of the functions of the operation unit 11.

A scanning unit 13 sequentially scans an original document placed on a document tray 14 including an Automatic Document Feeder (ADF), by using an image pickup device such as a charge coupled device (CCD) line sensor (not illustrated) or the like, and generates image data based on an image recorded on the original document. The scanned original document is discharged onto a document output tray 15. The original document is not necessarily scanned by and ADF, and may be scanned by using a Flat Bed Scanner (FBS) system. The FBS system scans an original document placed on a document glass (not illustrated), with the image pickup device, and discharges the scanned original document.

A printing unit 16 is a printer device that uses an electrophotographic method or the like and prints as a hard copy image data generated by the scanning unit 13 to record. To be more precise, toner supplied from a toner cassette is adhered to a photoconductive drum based on the image data. The adhered toner is transferred on the recording paper transported from a recording-paper cassette 17 by a recording-paper transportation unit, and the transferred recording paper is discharged onto a recording-paper output tray 18. The image data recorded by the printing unit 16 is not necessarily generated by the scanning unit 13, but may be image data received through a communication network when the copier 10 is connected with the communication network.

Figure 2:
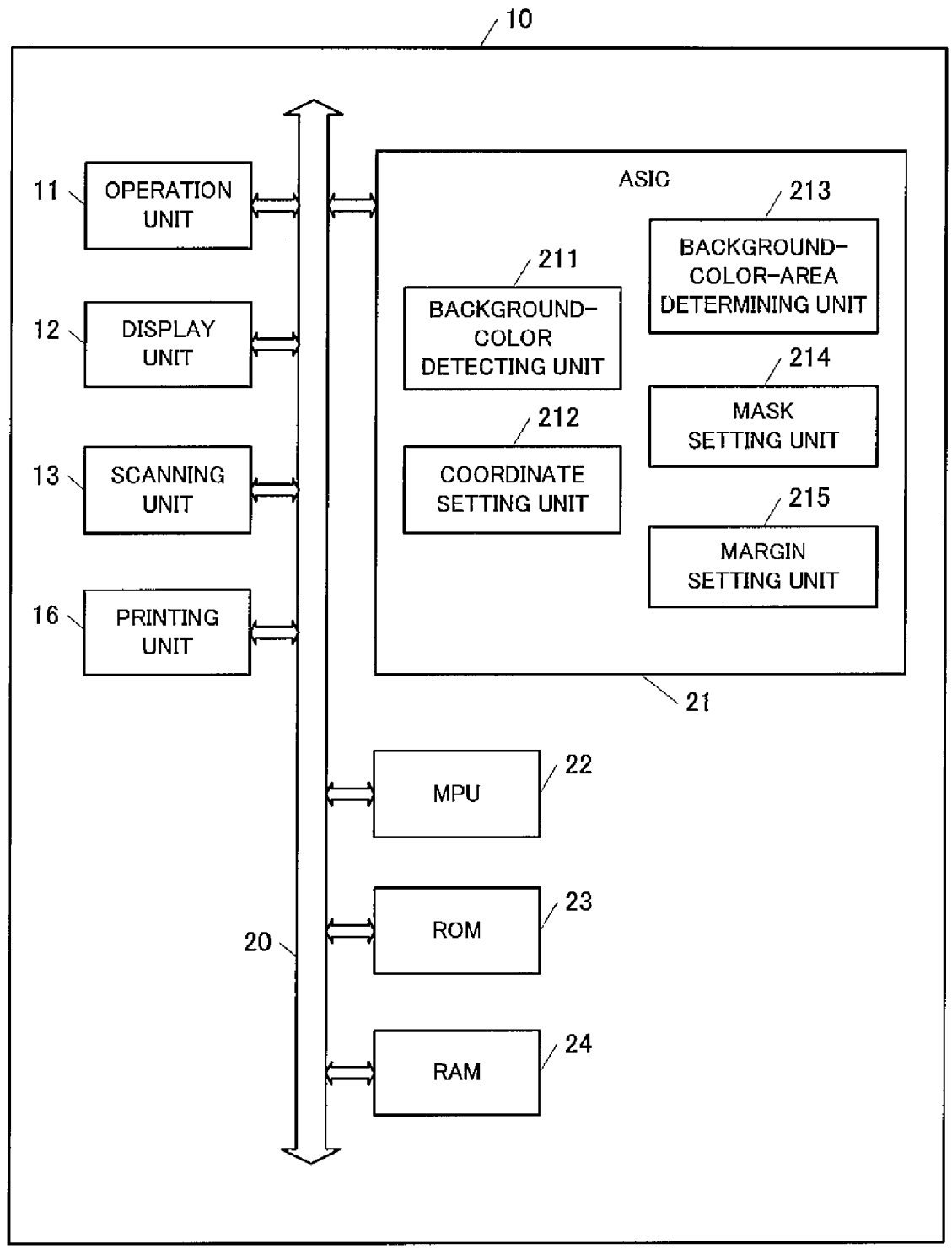
FIG. 2 is a block diagram illustrating a configuration of the copier.

FIG. 2 is a block diagram illustrating a configuration of the copier 10. Each of the above-described components is electrically connected via a bus 20, which is also electrically connected with the constituent units described below.

An Application Specific Integrated Circuit (ASIC) 21 includes a background-color detecting unit 211, a coordinate setting unit 212, a background-color-area determining unit 213, a mask setting unit 214 and a margin setting unit 215. The ASIC 21 includes an Auto Color Selector (ACS) function for determining whether a background color of the image data generated by the scanning unit 13 is color, gray or blank (including an unrecorded, colored paper) and performing a prescribed process in accordance with the determination result. The constituent units included in the ASIC 21 are explained later in more detail.

A Micro Processing Unit (MPU) 22 performs control based on input signals such as a command from the operation unit 11, computes data based on the input signals, generates output signals and displays contents on the display unit 12. MPU 22 also controls the scanning unit 13, the printing unit 16 and the ASIC 21. A Read Only Memory (ROM) 23 stores programs executed by the MPU 22 and data necessary for the control performed by the MPU 22. A Random Access Memory (RAM) 24 temporarily stores data necessary for total control performed by the MPU 22. Thus, the MPU 22 controls each of the components of the copier 10, in cooperation with the ROM 23 and the RAM 24, and various functions of the copier 10 are thereby accomplished.

Explanation and Processing Contents of the Constituent Units of the ASIC 21

The constituent units of the ASIC 21 and their processing contents are now explained. In the ACS function of the ASIC 21, a mean reduction unit obtains, for example, an average of tone values of a target pixel, a pixel disposed on the right thereof, a pixel disposed on the lower right thereof, and a pixel disposed thereunder, and substitutes the obtained value with the converted pixel. A gamma correction unit then adjusts a variation ratio of voltage equivalents with respect to the variation of image brightness. When the original document is represented in an RGB calorimetric system, such as when the original document is scanned by a color CCD, a matrix operation unit converts the RGB calorimetric system into an YCbCr calorimetric system.

Background Color Mask

Figure 3:
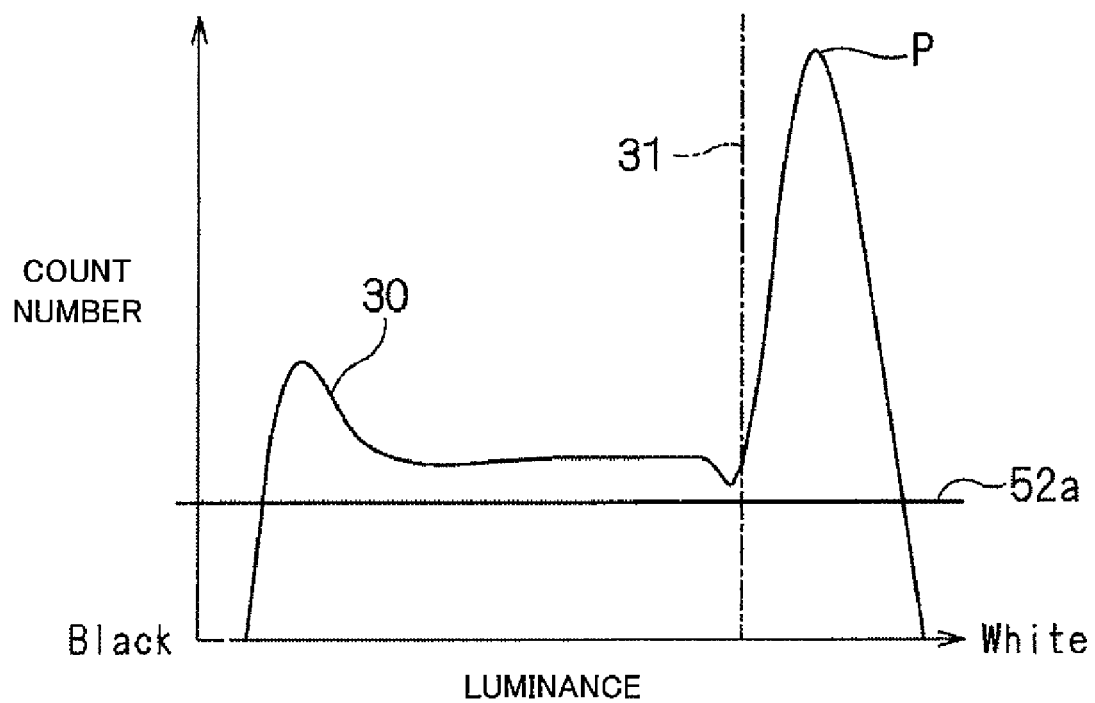
FIG. 3 is a histogram of luminance of an original document.

FIG. 3 is a histogram of luminance of an original document. The background-color detecting unit 211 detects a candidate area of the background color in a CbCr color-difference plane with respect to the original document scanned by the scanning unit 13. A method for detecting the candidate area, for example, extracts the luminance of the scanned original document, counts the luminance, and creates a histogram 30 illustrated in FIG. 3. The method extracts a peak "P" on a side of a white area, and detects, as the candidate area of the background color, the white-area side that exceeds a threshold value determined by the peak "P".

Figure 4:
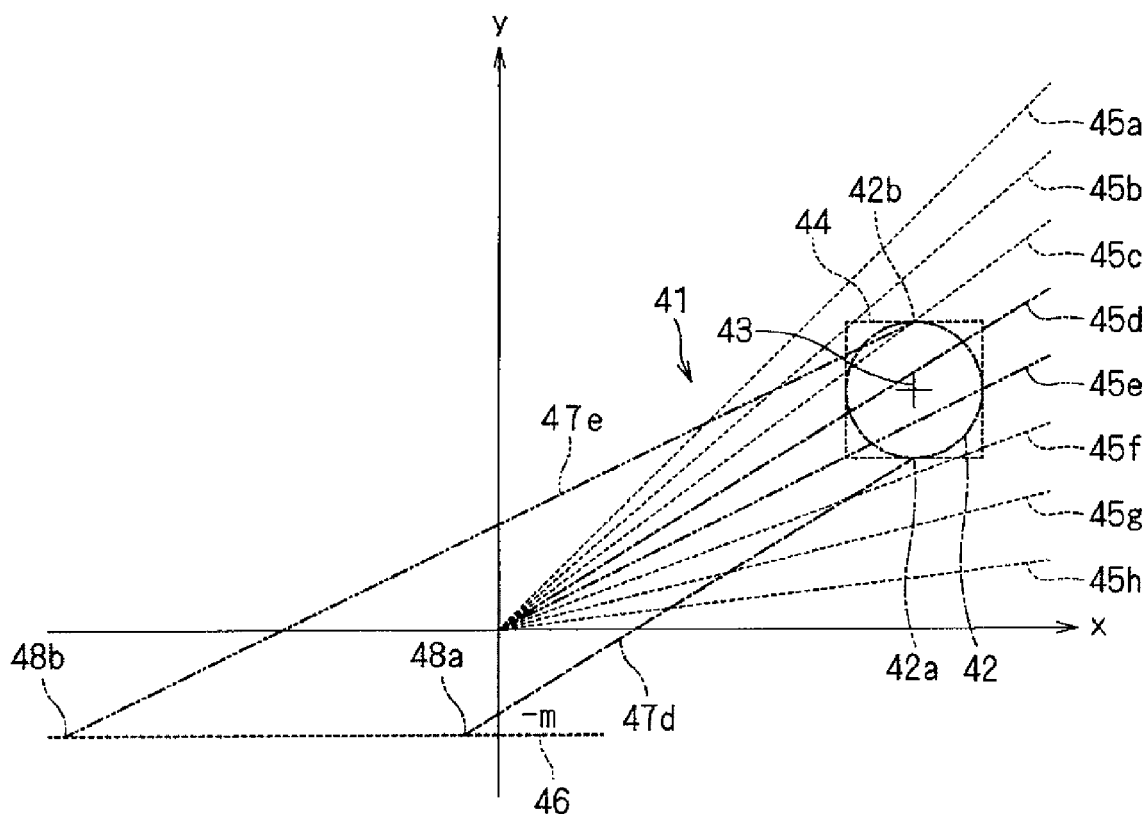
FIG. 4 illustrates a background-color mask.
Figure 5:
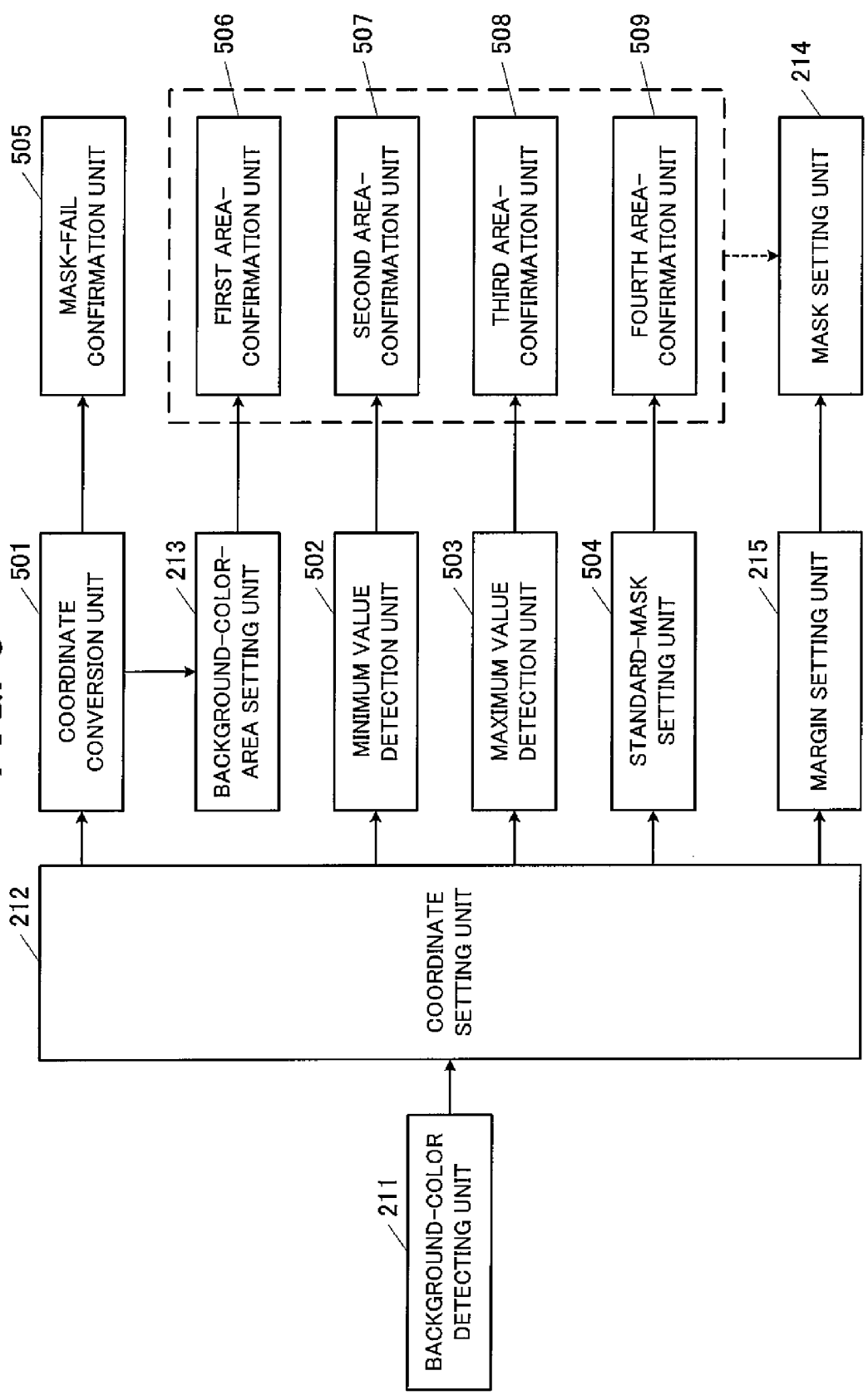
FIG. 5 is a block diagram functionally illustrating a background-color masking process.

FIG. 4 illustrates a background-color mask area 41, and FIG. 5 is a block diagram functionally illustrating a background-color masking process. The coordinate setting unit 212 sets an orthogonal coordinate system (in the present embodiment, an "x-y" coordinate system) based on a coordinate of a candidate area 42 of the background color detected by the background-color detecting unit 211, the coordinate disposed in the CbCr color-difference plane. More specifically, a coordinate conversion unit 501 converts the coordinate such that an axis indicating a greater absolute value of a central coordinate 43 of the candidate area 42 in the CbCr color-difference plane is referred to as an x-axis, and an axis indicating a smaller absolute value of the central coordinate 43 of the candidate area 42 is referred to as a y-axis. A minimum value detection unit 502 detects each minimum value of an "x" coordinate and a "y" coordinate of the candidate area 42, and a maximum value detection unit 503 detects each maximum value of the "x" coordinate and the "y" coordinate. Thus, a square area 44 surrounded by each of the detected minimum values and maximum values is obtained, and the background-color-area determining unit 213 tentatively determines the square area 44 as the background-color mask area 41. By the above-described coordinate setting, since the candidate area 42 detected by the background-color detecting unit 211, i.e., the central coordinate 43, falls within a predetermined area (in the present embodiment, the area defined by "y≧0" and "y≦x") in the "x-y" coordinate system, the area to be calculated is reduced.

The background-color-area determining unit 213 determines the background color area in the "x-y" coordinate system set by the coordinate setting unit 212 as follows: (1) an area in the "x-y" coordinate system is divided by lines 45a through 45h which are declined by one-eighth from the line of "y=x" to the line of "y=x/8", and the area of the divided areas that the central coordinate 43 falls within is detected; (2) the minimum value detection unit 502 draws a line 47d that is parallel to a line (the line 45d in FIG. 4) disposed directly above the central coordinate 43, from a coordinate 42a, which is a central coordinate of "x" and a minimum value of "y" of the candidate area 42 of the background color, towards a line 46 of "y=−m" (m>0). The line 46 is a lower limit of the "y" coordinate in the predetermined mask area. A coordinate where the line 46 of "y=−m" and the line 47d intersect is referred to as a coordinate 48a; (3) similarly to the above (2), the maximum value detection unit 503 draws a line 47e that is parallel to a line (the line 45e in FIG. 4) disposed directly below the central coordinate 43, from a coordinate 42b, which is the central coordinate of "x" and a maximum value of "y" of the candidate area 42 of the background color, towards the line 46 of "y=−m". A coordinate where the line 46 of "y=−m" and the line 47e intersect is referred to as a coordinate 48b. In other words, the background-color-area determining unit 213 tentatively determines the square area 44 based on the position of the candidate area 42 in the "x-y" coordinate system, adds an additional area surrounded by the coordinates 42a, 42b, 48a, and 48b, and determines the background color area. The lines 46, 47d, and 47e are the boundary lines of the additional area.

The mask setting unit 214 sets the mask on the background color area determined by the background-color-area determining unit 213. More specifically, the mask setting unit 214 excludes the predetermined area from the background color area determined by the background-color-area determining unit and sets the mask. Even more specifically, a standard-mask setting unit 504 excludes an area of "x<0" from the background-color mask area 41 determined by the background-color-area determining unit 213. Then, the mask setting unit 214 performs mask processing only on an area of "x≧0" in the background-color mask area 41. The area excluded by the standard-mask setting unit 504 is not necessarily the area of "x<0", and may be Ran area of "y<0" or an area of "x<0" and of "y<0".

The margin setting unit 215 sets the margin around the background color area determined by the background-color-area determining unit 213 to expand the mask area. More specifically, the background-color mask area 41 is expanded in a direction "y" by having a width of the lines 47d and 47e, which are the boundary lines of the background-color mask area 41, enlarged in the direction "y". Even more specifically, the margin setting unit 215 expands the background-color mask area 41 by enlarging the width of the line 47d towards a lower side thereof, and enlarging the width of the line 47e towards an upper side thereof. Here, points on the boundary lines of the mask are considered to be within the mask.

A mask-fail confirmation unit 505, a first area-confirmation unit 506, a second area-confirmation unit 507, a third area-confirmation unit 508 and a fourth area-confirmation unit 509 each confirm whether or not the background color reliably falls within the background-color mask area 41 set by the coordinate conversion unit 501, the background-color-area determining unit 213, the mask setting unit 214, and the margin setting unit 215. If the background color is not within the background-color mask area 41, a prescribed process is carried out so that the background color falls within the background-color mask area 41. The prescribed process may be, for example, a resetting process of the threshold value for recognizing the background color area as the background color, a resetting process of the threshold value for recognizing the values of "x" and "y" as the maximum value or the minimum value, and a reconverting process of the coordinate, or the like.

Operations of the Copier 10

FIG. 6 is a flow chart of execution procedures of a background-color-mask setting process. By having the above-described configuration, the copier 10 performs the processes described below. In FIG. 6, only the operations for setting the background-color mask by the copier 10 are represented, and illustrations and explanations of other processes are omitted. Unless otherwise specified, a series of processes/operations by the copier 10 are performed automatically under control of the MPU 22.

Under a state in which a power supply of the copier 10 is ON, a user waits until a command for scanning an original document 40 placed on the document tray 14 is entered (step S601). When the document-scanning command is entered, "Yes" is selected in step S601, and the original document 40 placed on the document tray 14 is scanned (step S602). When the original document 40 is scanned in step S602, the background-color detecting unit 211 detects the candidate area 42 of the background color (step S603).

When the candidate area 42 of the background color is detected in step S603, the coordinate setting unit 212 sets the "x-y" coordinate system based on the coordinate of the candidate area 42 in the CbCr color-difference plane, and the coordinate conversion unit 501 converts the coordinate (step S604). When the "x-y" coordinate system is set in step S604, the square area 44 surrounded by the minimum values and the maximum values respectively detected by the minimum value detection unit 502 and the maximum value detection unit 503 is tentatively determined as the background-color mask area 41 (step S605).

When the background-color mask area 41 is tentatively determined in step S605, the background-color-area determining unit 213 detects in which area of the "x-y" coordinate system the central coordinate 43 of the candidate area 42 exists (step S606), sets the boundary lines (the lines 46, 47d, and 47e) of the additional area (step S607), and determines the background-color mask area 41 (step S608).

When the background-color mask area 41 is determined in step S608, the mask setting unit 214 excludes the area of "x<0" (step S609). The margin setting unit 215 enlarges the width of the lines 46, 47d, and 47e, which are the boundary lines of the background-color mask area 41, in the direction "y" to expand the background-color mask area 41 in the direction "y" (step S610), and sets the mask (step S611). The following processes are executed by using the set background-color mask.

ADVANTAGES

Since the background color is masked by expanding the candidate area 42 of the detected background color to the achromatic-color area, the background color can be reliably masked.

Moreover, since the background-color-area determining unit 213 determines the background color area in the "x-y" coordinate system that is based on the candidate area 42, the background color area can be reliably and accurately masked.

Further, since the background-color-area determining unit 213 adds the additional area based on the position of the candidate area 42 in the "x-y" coordinate system, the background color can be reliably masked.

Furthermore, since the mask setting unit 214 excludes the predetermined area from the background color area determined by the background-color-area determining unit 213 and sets the mask, a computation area and a circuit size can be reduced.

Moreover, since the margin is set around the background color area determined by the background-color-area determining unit 213 to expand the mask area, the background color area can be reliably masked.

Further, since the coordinate setting unit 212 performs the coordinate setting such that the candidate area 42 detected by the background-color detecting unit 211 falls within the predetermined area in the "x-y" coordinate system, the computation area for the background-color mask and the circuit size can be reduced.

Further, since the background color detected by the background-color detecting unit 211 is color, gray or blank, the mask according to each of the background colors can be set.

VARIATIONS

Embodiments of the present invention have been described, however, the present invention is not limited to these embodiments. For example, while an example has been described in which the original document is scanned by the scanning unit 13, however, the ASIC 21 may perform the image processing after converting into the YCbCr calorimetric system by the matrix operation unit 303 based on RAW data of the RGB calorimetric system scanned from a digital camera or the like. Alternatively, the ASIC 21 may perform image processing after receiving an image file in a Joint Photographic Expert Group (JPEG) format from a personal computer (PC) etc., decoding the image file, and extracting YCbCr.

Moreover, the present invention is not limited to the copier 10, and may be a scanner, a facsimile machine, or a Multi Function Peripheral (MFP) including a combination of a copier, a scanner and a facsimile machine. Further, the present invention may be implemented as a wired logic circuit that performs the above-described processes, and the present invention is not limited to the above-described processes.

While the present invention has been described with respect to embodiments thereof, the invention may be modified in numerous ways and may assume many embodiments other than those specifically set out and described above. Accordingly, the appended claims cover all modifications that fall within the true spirit and scope of the present invention.

What is claimed is:

1. An image processing device comprising:
   a scanning unit that scans an original document;
   a background-color detecting unit that detects a candidate area of a background color in a chromaticity plane, with respect to the scanned original document;
   a background-color-area determining unit that determines a background color area based on the candidate area of the background color detected by the background-color detecting unit; and
   a mask setting unit that generates boundary lines extending to an achromatic-color area from the background color area determined by the background-color-area determining unit, and sets, as a mask, the background color area and an area surrounded by the background color area and the boundary lines.

2. The image processing device according to claim 1, further comprising:
   a coordinate setting unit that sets an orthogonal-plane coordinate system based on the candidate area of the background color detected by the background-color detecting unit,
   wherein the background-color-area determining unit determines the background color area in the orthogonal-plane coordinate system.

3. The image processing unit according to claim 2, wherein the background-color-area determining unit adds an additional area based on a position of the candidate area in the orthogonal-plane coordinate system and determines the background color area.

4. The image processing device according to claim 1, wherein the mask setting unit excludes a predetermined area from the background color area determined by the background-color-area determining unit, and sets the mask.

5. The image processing device according to claim 1, further comprising a margin setting unit that sets a margin around the background color area determined by the background-color-area determining unit, to expand a mask area.

6. The image processing device according to claim 2, wherein the coordinate setting unit sets a coordinate such that the candidate area detected by the background-color detecting unit falls within a predetermined area in the orthogonal-plane coordinate system.

7. The image processing device according to claim 1, wherein the background color detected by the background-color detecting unit is color, gray or blank.

8. An image processing device comprising:
   means for scanning an original document;
   means for detecting a candidate area of a background color in a chromaticity plane, with respect to the scanned original document;
   means for determining a background color area based on the candidate area of the detected background color; and
   means for generating boundary lines extending from the determined background color area to an achromatic-color area, and for setting, as a mask, the background color area and an area surrounded by the background color area and the boundary lines.

9. The image processing device according to claim 8, further comprising means for setting an orthogonal-plane coordinate system based on the candidate area of the detected background color.

10. The image processing device according to claim 9, further comprising means for adding an additional area based on a position of the candidate area in the orthogonal-plane coordinate system and determining the background color area.

11. The image processing device according to claim 8, further comprising means for excluding a predetermined area from the background color area determined by the background-color-area determining unit and setting a mask.

12. The image processing device according to claim 8, further comprising means for setting a margin around the determined background color area to expand a mask area.

13. The image processing device according to claim 9, further comprising means for setting a coordinate such that the candidate area detected by the background-color detecting unit falls within a predetermined area in the orthogonal-plane coordinate system.

14. The image processing device according to claim 8, wherein the detected background color is color, gray, or blank.

15. An image processing method comprising the steps of:
scanning an original document;
detecting a candidate area of a background color in a chromaticity plane, with respect to the scanned original document;
determining a background color area based on the candidate area of the detected background color; and
generating boundary lines extending from the determined background color area to an achromatic-color area, and setting, as a mask, the background color area and an area surrounded by the background color area and the boundary lines.

16. The image processing method according to claim 15, further comprising the steps of setting an orthogonal-plane coordinate system based on the candidate area of the detected background color, and determining the background color area in the orthogonal plane coordinate system.

17. The image processing method according to claim 16, further comprising the steps of adding an additional area based on a position of the candidate area in the orthogonal plane coordinate system and determining the background color area.

18. The image processing method according to claim 15, further comprising the steps of excluding a predetermined area from the determined background color area and setting a mask.

19. The image processing method according to claim 15, further comprising the step of setting a margin around the determined background color area to expand a mask area.

20. The image processing method according to claim 16, further comprising the step of setting a coordinate such that the detected candidate area will fall within a predetermined area in the orthogonal-plane coordinate system.

\* \* \* \* \*